Patented Mar. 31, 1953

2,633,470

UNITED STATES PATENT OFFICE 2,633,470

AROMATIC HYDROXY ACID COMPOUNDS AND METHODS FOR PRODUCING THE SAME

Marie-Jo Sullivan, Detroit, Mich., and Clarence Kenneth Banks, Westfield, N. J., assignors to Parke, Davis & Company, Detroit, Mich., a corporation of Michigan No Drawing. Application January 25, 1952, Serial No. 268,347

4 Claims. (Cl. 260—349)

This invention relates to aromatic hydroxy acid compounds and to methods for obtaining the same. More particularly, the invention relates to p-azidosalicylic acid compounds having the formula,

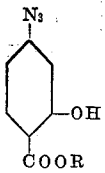

where R is hydrogen, a lower alkyl group, or an alkali or alkaline earth metal ion.

In accordance with the invention, compounds having the above general formula are produced by diazotizing a p-aminosalicylic acid compound of formula,

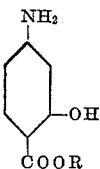

where R represents hydrogen or a lower alkyl group and subsequently reacting the resultant p-diazonium salts with hydrazine to yield the desired p-azidosalicylic acid compounds. These transformations can be illustrated diagrammatically as follows:

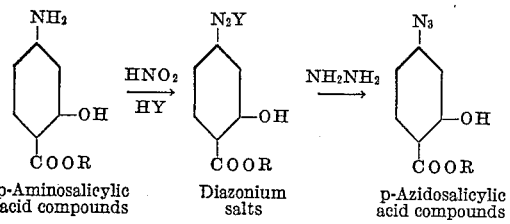

where R has the same significance as given above, HY represents a mineral acid or a strong organic acid and Y is an anion of said mineral or organic acids.

Diazotization of the p-aminosalicylic acid compound can be accomplished by reacting the p-aminosalicylic acid compound with nitrous acid in the presence of a highly ionizable acid at a temperature below about 15° C. The nitrous acid used in the process is generated in situ by the interreaction of an alkali metal salt or ester of nitrous acid with the strong acid. Suitable highly ionizable acids are mineral acids such as hydrochloric, hydrobromic, sulfuric and nitric acids and strong organic acids such as trichloroacetic acid.

The reaction between hydrazine and the p-diazonium salt of the salicylic acid compound is carried out in aqueous solution at a pH between 7 and 10 and at a temperature below about 15° C. It is preferable to carry out the reaction at about pH 8 and to employ an excess of hydrazine. The hydrazine may be supplied to the reaction mixture as its hydrate, as an aqueous solution or in its gaseous state.

The p-azidosalicylic acid can also be prepared by hydrolyzing an alkyl ester thereof with dilute alkali, preferably at a temperature below 100° C. The metal salts of p-azidosalicylic acid can be prepared either by neutralization of the free acid with alkali or by the aforementioned hydrolytic method.

The products of the invention possess valuable therapeutic properties. They are of particular value in the treatment of tuberculosis and especially when used in conjunction with streptomycin or dihydrostreptomycin.

The invention is illustrated by the following examples:

Example 1

2534 g. of ethyl p-aminosalicylate is suspended in 14 l. of ice water, 4.2 l. of concentrated hydrochloric acid, added with stirring and the solution cooled to about 0° C. A solution of 966 g. of sodium nitrite in about 1200 cc. of water is added with stirring, keeping the temperature at 0 to 5° C. and the mixture stirred for about fifteen minutes. The reaction mixture is filtered and the filtrate added to a buffered solution comprising 7.63 kg. of anhydrous sodium acetate and 3.82 kg. of hydrazine hydrate in 36 l. of ice water. The product is removed by filtration and recrystallized from dilute alcohol to yield the desired ethyl p-azidosalicylate (M. P. 50–51° C. with decomposition).

Example 2

10 g. of p-aminosalicylic acid in 200 cc. of water is treated with 5.6 g. of sodium bicarbonate, 4.6 g. of sodium nitrite in 10 cc. of water is added to the filtrate at 0–10° C. and 39 g. of trichloroacetic acid is then stirred in at 10° C. After standing for fifteen minutes, the filtrate is poured into 500 cc. of an ice-cold solution containing 30 g. of sodium acetate and 15 g. of 85 per cent hydrazine hydrate. On adjusting to pH 5 with trichloroacetic acid, p-azidosalicylic acid is precipitated which, after drying, melts at 193–195° C. with decomposition.

The sodium and calcium salts of p-azidosalicylic acid can be conveniently made by dissolving the acid in a lower aliphatic alcohol and adding a solution of the base in the same alcohol. The products precipitate on standing for a few hours.

*Example 3*

9.2 g. of methyl p-aminosalicylate suspended in 150 cc. of ice water containing 14 cc. of concentrated hydrochloric acid maintained at 0° to 5° C. is treated with 3.82 g. of sodium nitrite in 5 cc. of water. Thereupon the mixture is stirred for 15 minutes and the filtrate immediately coupled by adding 200 cc. of a solution containing 15 g. of 85 per cent hydrazine hydrate, 30 g. of anhydrous sodium acetate and crushed ice. After adjusting to pH 8, methyl p-azidosalicylate crystallizes out and is filtered off; M. P. 70–71° C. with decomposition.

*Example 4*

11.7 g. of isopropyl p-aminosalicylate suspended in 150 cc. of ice water containing 15.5 cc. of concentrated hydrochloric acid is treated with 4.15 g. of sodium nitrite in 6 cc. of water. Thereupon the mixture is allowed to stand for fifteen minutes and the filtrate immediately coupled by adding it to 200 cc. of a solution containing 16.5 g. of 85 per cent hydrazine hydrate, 33 g. of anhydrous sodium acetate and crushed ice. On adjusting to pH 8 an oil separates out, which may be crystallized by dissolving in acetone, cooling with solid carbon dioxide and pouring the solution in ice water. The resultant isopropyl p-azidosalicylate melts at 28–30° C. with decomposition.

What we claim is:

1. A compound of the formula,

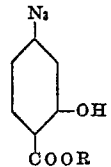

where R is a member of the class consisting of hydrogen, alkali metal ions, alkaline earth metal ions and lower alkyl radicals.

2. p-Azidosalicylic acid.
3. The sodium salt of p-azidosolicylic acid.
4. Process for the production of a p-azidosalicylic acid compound of formula,

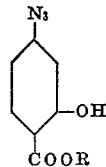

which comprises diazotizing a p-aminosalicylic acid compound of formula,

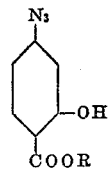

and subsequently reacting the p-diazonium salt of the salicylic acid compound with hydrazine in aqueous solution at a pH of 7 to 10 and at a temperature below 15° C.; where R is a member of the class consisting of hydrogen, and lower alkyl radicals.

MARIE-JO SULLIVAN.
CLARENCE KENNETH BANKS.

No references cited.